(12) United States Patent
Chen

(10) Patent No.: US 8,031,406 B2
(45) Date of Patent: Oct. 4, 2011

(54) HEAD UP DISPLAY FOR VEHICLES

(75) Inventor: Cheng-Huan Chen, Hsinchu (TW)

(73) Assignee: Conserve & Associates, Inc., Taoyuan County (TW)

( * ) Notice: Subject to any disclaimer, the term of this patent is extended or adjusted under 35 U.S.C. 154(b) by 350 days.

(21) Appl. No.: 12/153,282

(22) Filed: May 16, 2008

(65) Prior Publication Data

US 2008/0285139 A1  Nov. 20, 2008

(30) Foreign Application Priority Data

May 18, 2007  (TW) ............................... 96117850 A

(51) Int. Cl.
*G02B 27/14* (2006.01)
(52) U.S. Cl. ........................................................ 359/630
(58) Field of Classification Search .................. 359/630, 359/471, 443, 459, 353
See application file for complete search history.

(56) References Cited

U.S. PATENT DOCUMENTS

| | | | | |
|---|---|---|---|---|
| 5,278,532 A * | 1/1994 | Hegg et al. | .......................... | 345/7 |
| 5,771,039 A * | 6/1998 | Ditzik | ............................. | 345/178 |
| 5,902,033 A * | 5/1999 | Levis et al. | .................... | 353/122 |
| 7,158,095 B2 * | 1/2007 | Jenson et al. | ...................... | 345/7 |
| 7,462,984 B2 * | 12/2008 | Handa et al. | ................... | 313/503 |
| 2004/0239880 A1 * | 12/2004 | Kapellner et al. | ............... | 353/20 |
| 2005/0002097 A1 * | 1/2005 | Boyd et al. | ..................... | 359/487 |
| 2005/0052873 A1 * | 3/2005 | Sokolov | ......................... | 362/341 |
| 2006/0044523 A1 * | 3/2006 | Teijido et al. | .................... | 353/53 |

* cited by examiner

*Primary Examiner* — Ricky Mack
*Assistant Examiner* — Vipin Patel
(74) *Attorney, Agent, or Firm* — Rosenberg, Klein & Lee

(57) ABSTRACT

A head up display for vehicles includes: at least one light source; at least one light guide set in front of the light source; an image panel set in front of the light guide; and a surface with the feature of at least partial specular reflection. Wherein the light emitted from the light source illuminates the image panel via the light guide to project an image on the image panel onto the surface and then be reflected to an observer, so as to form a virtual image observed by the observer. The light guide of the present invention can reduce the light loss of the head up display for vehicles and make the illumination light on the image panel more homogeneous and possessing high directionality, and so as to improve the brightness and quality of the virtual image formed by the head up display for vehicles.

15 Claims, 4 Drawing Sheets

HEAD UP DISPLAY FOR VEHICLES

BACKGROUND OF THE INVENTION

1. Field of the Invention

The present invention relates to an image display system, and more particularly, to a head up display for vehicles which is viewed through a specular or partially specular reflection surface.

2. Description of the Prior Art

Conventionally, the projector is often used in the meeting, business briefing, teaching and training. During the recent years, the technology of imaging module and display, such as the Liquid Crystal Display (LCD), Digital Light Processing (DLP) or Liquid Crystal on Silicon (LCOS), progress very rapidly. Therefore, the products which combine the imaging module and the display are increasingly applied for versatile fields, for example, the home drama, helmet display, small portable display and Head-Up Display (HUD).

Normally, the conventional projection displays project images onto a reflective surface or a screen, which have a diffusive reflection characteristic. Thus, their applications are very limited.

Head up display (HUD) is originated from the aviation technique, but the conventional aviation HUD is complex and bulky, and its setup location and magnification are fixed and unadjustable, and such that it is very expensive.

Along with the advancing of technology, presently the HUD is more and more popular for the application of automobile, but the HUD for vicheles uses traditional direct-view display as the image source, whose angular emission profile is highly diffusive which results in low brightness or requires high driving power to meet a specified brightness.

SUMMARY OF THE INVENTION

In order to solve the aforementioned problem, one object of the present invention is to provide a head up display for vehicles including a light guide. It may reduce the optical loss, which is achieved by that the incident light from the light source illuminates onto the image panel has high directivity. As a result, the observer may see a brighter image, and it may make the incident light from the light source illuminates onto the image panel more homogeneously. Consequently, the observer may see an image with more uniform brightness and better image quality.

One object of the present invention is to provide a head up display for vehicles, which includes a diffusive film to make the image of light source itself not visible for the viewer when looking at the image.

One object of the present invention is to provide a head up display for vehicles, which includes an imaging optical module to make the design of the reflective image display system more efficient and flexible. It may adjust the magnification of the image by moving or adjusting the imaging optical module.

One object of the present invention is to provide a head up display for vehicles, which includes a controllable diaphragm to adjust the brightness of the image.

One object of the present invention is to provide a head up display for vehicles, which includes a single image panel and multiple discrete light sources and light guides to increase the flexibility in system design.

One object of the present invention is to provide a head up display for vehicles, which includes a backlight module illuminating partial region of the image panel to form a direct type display image. On the other hand, partial region of the image panel is still illuminated by a light source and a light guide to form a virtual image, and such as to increase the design flexibility and the application field of the image display system.

One object of the present invention is to provide a head up display for vehicles, which includes a reflective image panel and a beam splitter. The image on the reflective image panel is projected onto a surface with at least some partial specular reflection to form a virtual image through the beam splitter.

One object of the present invention is to provide a head up display for vehicles, which may be applied to any inside surface with specular reflection or partial specular reflection of a vehicle, such as a front shield glass (windshield), a rear shield glass, a back mirror, a rear-view mirror or a transparent plate with at least some partial specular reflection which is controllable to rise or fall.

Correspondingly, the advantages of the head up display for vehicles according the present invention includes: 1. It may reduce the cost of the imaging apparatus; 2. It may improve the optical properties of the imaging apparatus, such as brightness; 3. It may reduce the size and weight of the imaging apparatus; 4. It may increase the magnification properties and other modulation of the imaging apparatus; 5. It may increase the design flexibility of the imaging apparatus, such as a combination-type apparatus of the imaging apparatus; and 6. It may widen the application field of the imaging apparatus.

To achieve the objects mentioned above, one embodiment of the present invention is to provide a head up display for vehicles, which includes: at least one light source; at least one bulk and gradual change type light guide set in front of the light source, wherein the area of the exit surface of the light guide is bigger than the area of entrance surface of the light guide; an image panel set in front of the light guide; a surface being an inside surface with the feature of at least partial specular reflection of a vehicle. Wherein the light emitted from the light source illuminates the image panel via a common propagation space of the light guide to project an image on the image panel onto the surface and then be reflected to an observer, so as to form a virtual image observed by the observer; and an imaging optical module set between the image panel and the surface to adjust the magnification of the image by moving or adjusting the imaging optical module, wherein the imaging optical module is a lens, a lens module or a zoom lens.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
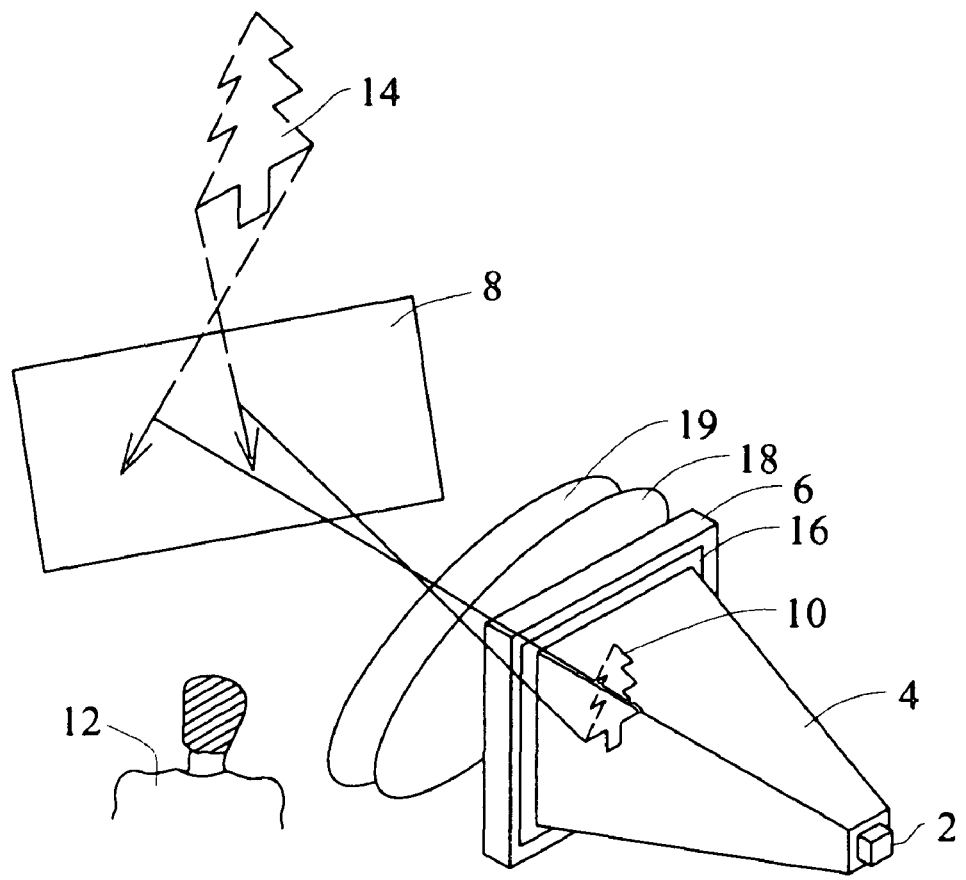
FIG. 1 is an application schematic diagram to demonstrate a reflective image display system according to one embodiment of the present invention.

FIG. 1 is an application schematic diagram to demonstrate a head up display for vehicles according to one embodiment of the present invention, which includes: a light source 2; a light guide 4 set in front of the light source 2; an image panel 6 set in front of the light guide 4; and a surface 8 with the feature of at least partial specular reflection. The light emitted from the light source 2 illuminates the image panel 6 via the light guide 4 to project an image 10 on the image panel 6 onto the surface 8 and then be reflected to an observer 12, so as to form a virtual image 14 observed by the observer 12.

In one embodiment, the image 10 and the virtual image 14 may be black and white, mono color, multi color or full color.

In one embodiment, the light source 2 may be a Light Emitting Diode (LED), a Laser Diode (LD), a high intensity discharge lamp, an incandescent lamp or a halogens lamp.

It is easy to be understood for the person with ordinary skill in the art that the head up display for vehicles according to this invention may include many different optical devices or modules to improve the design and operation flexibility and the image quality of the system. For example, please continuously refer to FIG. 1. In one embodiment, the head up display for vehicles according to this invention may further include a diffusive film 16 set between the light guide 4 and the image panel 6 to make the light source 2 itself less visible for the observer 12. The diffusive film 16 may be a foggy surface glass, a foggy surface plastic, a grating or a transparent device with a surficial micro structure. In another embodiment, the head up display for vehicles according to this invention may further include an imaging optical module 18 set between the image panel 6 and the surface 8 to make the design of the head up display for vehicles more efficient and flexible. For example, it may adjust the magnification of the image 10 by moving or adjusting the imaging optical module 18. In another embodiment, the imaging optical module 18 may be a lens, a lens module or a zoom lens. In addition, in another embodiment, the head up display for vehicles according to this invention may further include a controllable diaphragm 19 set between the imaging optical module 18 and the surface 8 to adjust the brightness of the virtual image 14. And, the controllable diaphragm 19 may prevent the pollution particles or the outside light enter into the image panel 6 when the system is turned off.

Figure 2A:
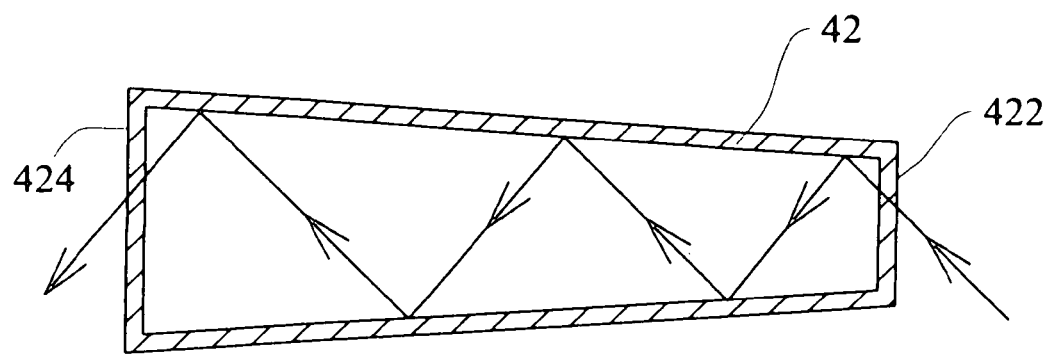
FIG. 2A and FIG. 2B are separated side-view schematic diagrams of the light guides according to embodiments of the present invention.

Please refer to FIG. 2A, which is a side-view schematic diagram of a light guide 42 according to one embodiment of the present invention. The light guide 42 is a hollow guiding tube, the emitted light from the light source enters into the entrance surface 422, and then irradiates onto the image panel from the exit surface 424 after multi reflection. In another embodiment, it may further plate a high reflection coating on the inner surface of the light guide 42.

Please continuously refer to FIG. 2A, in one embodiment, the light guide 42 may be a gradual change type. As shown in the figure, the area of the exit surface 424 is bigger than the area of entrance surface 422.

Figure 2B:
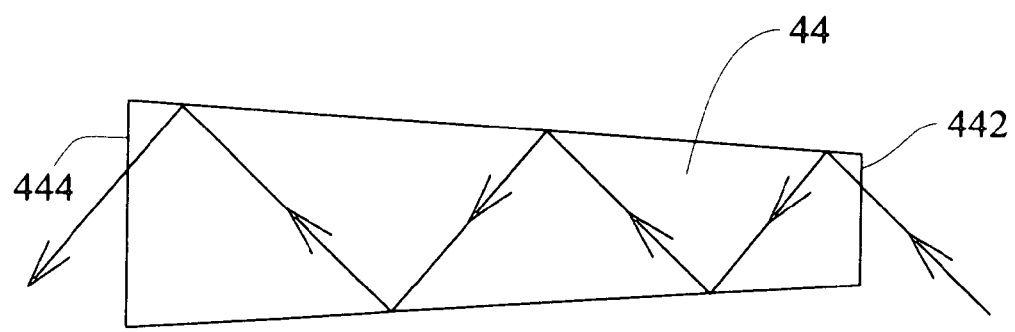

Please refer to FIG. 2B, which is a side-view schematic diagram of a light guide 44 according to one embodiment of the present invention. The light guide 44 is a solid guiding tube, the emitted light from the light source enters into the entrance surface 442, and then irradiates onto the image panel from the exit surface 444 after multi reflection. In one embodiment, the light guide 44 has a coarse exit surface 444, and the material of the light guide 44 may be glass, plastic or liquid. And, the light guide 44 may be a fiber or a fiber bundle.

Therefore, one feature of the head up display for vehicles according to the present invention is that it has a light guide, which advantages include: 1. The optical loss, resulting from a highly diffusive illumination onto the image panel, is lower and the system has illumination with high directionality, thus the image seen by the observer is brighter; and 2. The incident light from the light source may homogeneously irradiate onto the image to make the image brightness seen by the observer be more even and the image quality be better.

Figure 3A:
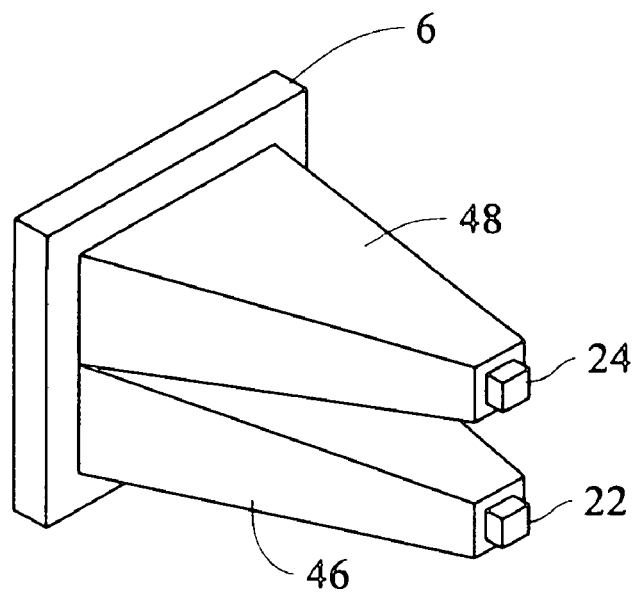
FIG. 3A, FIG. 3B and FIG. 3C are separated partial schematic diagrams of a reflective image display system according to embodiments of the present invention.

In one embodiment, the reflective image display system according to the present invention may adopt a single image panel and multiple discrete light sources and light guides to increase the system design flexibility. Please refer to FIG. 3A, which is a partial schematic diagram of a reflective image display system according to one embodiment of the present invention. The reflective image display system includes a single image panel 6 and two discrete light sources 22, 24 and two light guides 46, 48.

Figure 3B:
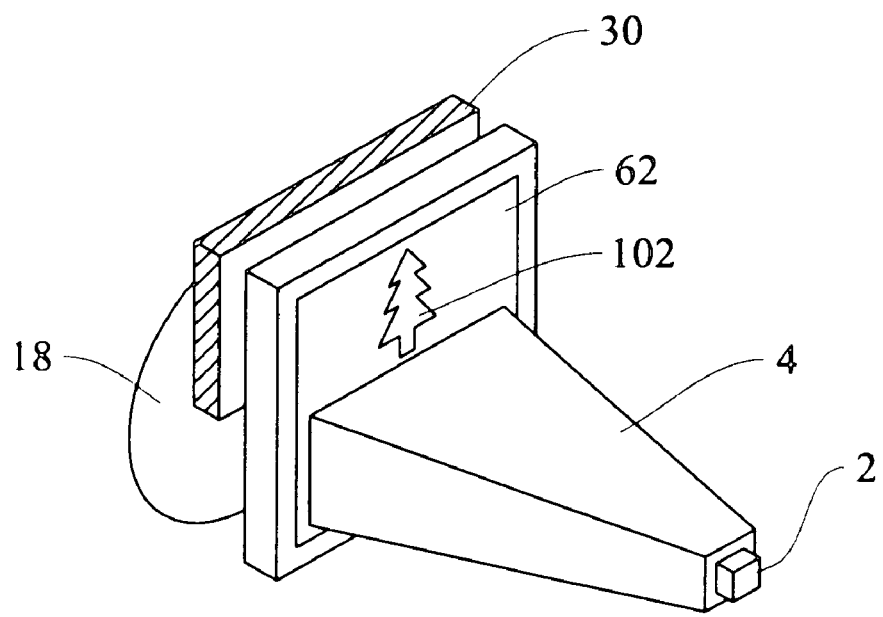

In the previous embodiment, the image panel 6 is transmissive or transreflective, but it is not limited by this. Please refer to FIG. 3B, which is a partial schematic diagram of a reflective image display system according to one embodiment of the present invention. The reflective image display system includes a single image panel 62. A backlight module 30 illuminates partial region of the image panel 62 to form a direct type display image 102. On the other hand, partial region of the image panel 62 is still illuminated by the light source 2 and the light guide 4 and then magnified by the imaging optical module 18 to form a virtual image. This kind of design can increase the design flexibility and the application field of the image display system.

Figure 3C:
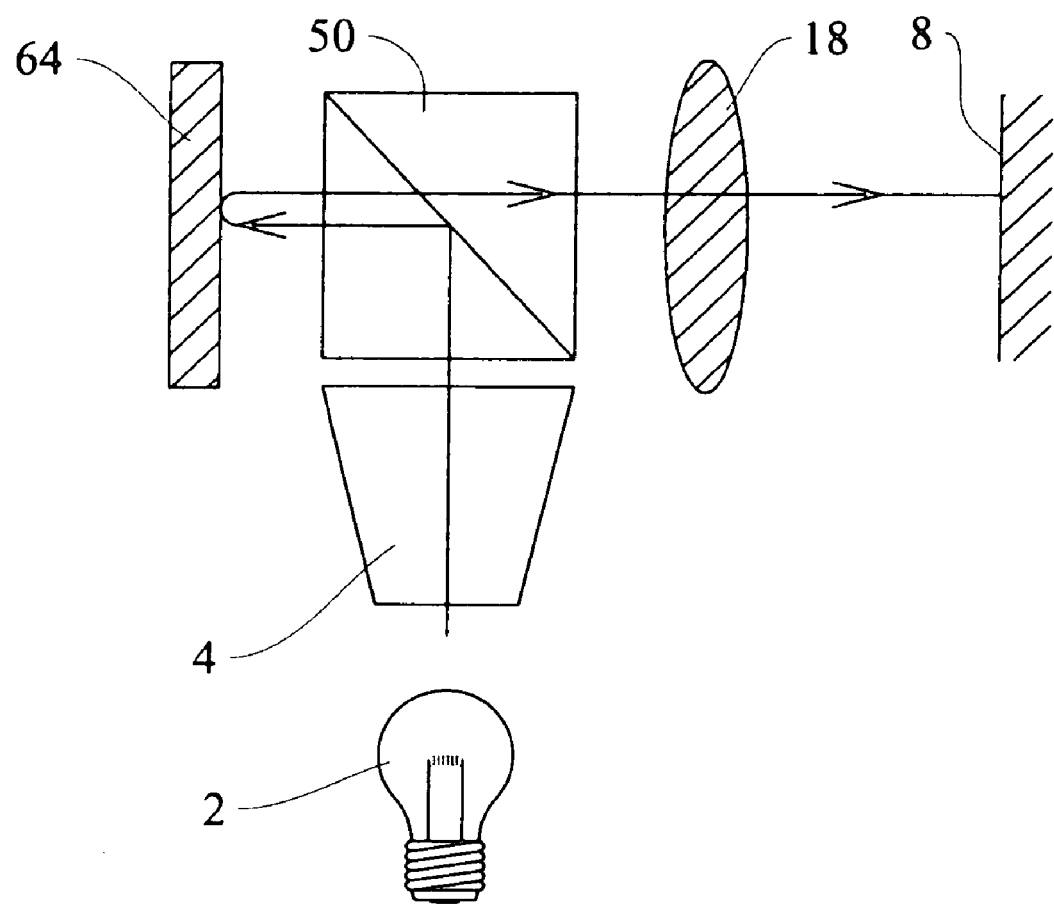

In another embodiment, the head up display for vehicles adopts a reflective image panel. Please refer to FIG. 3C, which is a partial schematic diagram of a head up display for vehicles according to one embodiment of the present invention. The head up display for vehicles includes a reflective image panel 64 and a beam splitter 50, the emitted light from the light source 2 irradiates onto the beam splitter 50 through the light guide 4 and then is reflected to the reflective image panel 64. Next, the light is reflected by the reflective image panel 64 to transmit through the beam splitter 50 and then is projected onto a surface 8 with at least some partial specular reflection by an imaging optical module 18 to form a virtual image.

Furthermore, the head up display for vehicles according to the present invention may also be applied to any inside surface with specular reflection or partial specular reflection of a vehicle. Please refer to FIG. 1 and FIG. 3C, the surface 8 may be a front shield glass (windshield), a rear shield glass, a back mirror, a rear-view mirror or a transparent plate with at least some partial specular reflection which is controllable to rise or fall. For example, the versatile information of the meters may be directly projected onto the front shield glass within the eye sight of the driver, such that the driver needs not to lower his head to look up the meters. Accordingly, the driver may see environmental information of the vehicle and accurately control the vehicle movement anytime. It may not only elevate the comfort of driving but also increase the reaction speed of the driver change for the environmental change to improve the driving safety.

To sum up, the advantages of the head up display for vehicles according the present invention includes: 1. It may reduce the cost of the imaging apparatus; 2. It may improve the optical properties of the imaging apparatus, such as brightness; 3. It may reduce the size and weight of the imaging apparatus; 4. It may increase the magnification properties and other modulation of the imaging apparatus; 5. It may increase the design flexibility of the imaging apparatus, such as a combination-type apparatus of the imaging apparatus; and 6. It may widen the application field of the imaging apparatus.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the Claims appended hereto and their equivalents.

What is claimed is:

1. A head up display for vehicles, comprising:
   at least one light source;
   at least one bulk and gradual change type light guide set in front of the light source, wherein the area of the exit surface of the light guide is bigger than the area of entrance surface of the light guide;
   an image panel set in front of the light guide;
   a surface being an inside surface with the feature of at least partial specular reflection of a vehicle, wherein the light emitted from the light source illuminates an image on the image panel via a common propagation space of the light guide and then be reflected by the surface to an observer, so as to form a virtual image observed by the observer; and
   an imaging optical module set between the image panel and the surface to adjust the magnification of the image by moving or adjusting the imaging optical module, wherein the imaging optical module is a lens, a lens module or a zoom lens.

2. The head up display for vehicles according to claim 1, wherein the image and the virtual image are black and white, mono color, multi color or full color.

3. The head up display for vehicles according to claim 1, wherein the light source may be a Light Emitting Diode (LED), a Laser Diode (LD), a high intensity discharge lamp, an incandescent lamp or a halogens lamp.

4. The head up display for vehicles according to claim 1, further comprising a diffusive film set between the light guide and the image panel.

5. The head up display for vehicles according to claim 4, wherein the diffusive film is a foggy surface glass, a foggy surface plastic, a grating or a transparent device with a surficial micro structure.

6. The head up display for vehicles according to claim 1, further comprising a controllable diaphragm set between the imaging optical module and the surface.

7. The head up display for vehicles according to claim 1, wherein the light guide is a hollow guiding tube.

8. The head up display for vehicles according to claim 1, wherein the light guide is a solid guiding tube.

9. The head up display for vehicles according to claim 8, wherein the material of the light guide is glass, plastic or liquid.

10. The head up display for vehicles according to claim 8, wherein the light guide has a coarse exit surface.

11. The head up display for vehicles according to claim 1, comprising two discrete sets of light sources and light guides.

12. The head up display for vehicles according to claim 1, further comprising a backlight module to illuminate partial region of the image panel to form a direct type display image.

13. The head up display for vehicles according to claim 1, wherein the image panel is transmissive or transreflective.

14. The head up display for vehicles according to claim 1, wherein the image panel is a reflective image panel and the head up display for vehicles further comprises a beam splitter set between the light guide and the image panel, the emitted light from the light source illuminates onto the beam splitter through the light guide and then is reflected to the reflective image panel, next, the light is reflected by the reflective image panel to transmit through the beam splitter and then is projected onto the surface.

15. The head up display for vehicles according to claim 1, wherein the surface is a front shield glass, a rear shield glass, a back mirror, a rear-view mirror or a transparent plate with at least some partial specular reflection which is controllable to rise or fall.

\* \* \* \* \*